US005776850A

United States Patent [19]
Klatte et al.

[11] Patent Number: 5,776,850
[45] Date of Patent: Jul. 7, 1998

[54] CHEMICALLY IMPREGNATED ZEOLITE AND METHOD FOR ITS PRODUCTION AND USE

[75] Inventors: Fred Klatte, San Francisco, Calif.; James Aamodt, Wilsonville, Oreg.; David Biswell, Kingsburg, Calif.

[73] Assignee: Klatte Inc., Petaluma, Calif.; a part interest

[21] Appl. No.: 445,275

[22] Filed: May 19, 1995

Related U.S. Application Data

[63] Continuation-in-part of Ser. No. 382,601, Feb. 2, 1995, which is a continuation-in-part of Ser. No. 150,438, Nov. 10, 1993, Pat. No. 5,464,598, which is a continuation-in-part of Ser. No. 975,680, Nov. 13, 1992, Pat. No. 5,278,112.

[51] Int. Cl.$^6$ ............................................. B01J 29/04
[52] U.S. Cl. ....................................... 502/64; 502/60
[58] Field of Search ...................................... 502/64, 60

[56] References Cited

U.S. PATENT DOCUMENTS 4,695,296  9/1987  Christe ............................ 502/68
5,376,164  12/1994  Zarchy et al. ...................... 95/41

FOREIGN PATENT DOCUMENTS

| 0132049 | 1/1985 | European Pat. Off. |
| 52-38028 | 3/1977 | Japan. |
| 61-256915 | 11/1986 | Japan. |
| 64-71804 | 3/1989 | Japan. |
| 3-979 | 1/1991 | Japan. |

OTHER PUBLICATIONS

Translation of JP 61-256915.
Translation of JP 3-979.
Hawley, *The Condensed Chemical Dictionary* 1981 (no month) p. 777.

*Primary Examiner*—Steven Bos
*Assistant Examiner*—Thomas G. Dunn, Jr.
*Attorney, Agent, or Firm*—Limbach & Limbach L.L.P.

[57] ABSTRACT

A class of methods for impregnating zeolite crystals with one of: sodium chlorite, acetic acid, citric acid, chlorine, sodium sulfite, and sodium bisulfite. Also, the resulting zeolite crystals impregnated under this class of methods.

2 Claims, 1 Drawing Sheet

5,776,850

CHEMICALLY IMPREGNATED ZEOLITE AND METHOD FOR ITS PRODUCTION AND USE

CROSS-REFERENCE TO RELATED APPLICATION

The present application is a continuation-in-part of pending U.S. patent application Ser. No. 08/382,601, filed on Feb 2, 1995 which is a continuation-in-part of pending U.S. patent application Ser. No. 08/150,438 filed Nov. 10, 1993, now U.S. Pat. No. 5,464,598, which is a continuation-in-part of U.S. patent application Ser. No. 07/975,680, filed on Nov. 13, 1992, issued as a U.S. Pat. No. 5,278,112 on Jan. 11, 1994.

FIELD OF THE INVENTION

The invention relates to processes for producing chemically impregnated zeolite and coated, chemically impregnated zeolite, to the products of such processes, and to use of such products for absorbing a contaminant from a fluid. A preferred embodiment of the invention is a process for chemically impregnating zeolite crystals with sodium chlorite.

BACKGROUND OF THE INVENTION

Zeolites are hydrated metal aluminosilicate compounds with well-defined (tetrahedral) crystalline structures. Because zeolite crystals (both natural and synthetic) have a porous structure with connected channels extending through them, they have been employed as molecular sieves for selectively absorbing molecules on the basis of size, shape, and polarity.

Volumes packed with zeolite crystals (for example, small zeolite crystals chosen to have size in the range from 0.2 mm to several millimeters) have been employed in water and air (or other gas) filtration systems to selectively absorb contaminants from a flowing stream of water or gas.

It has been proposed to treat zeolite crystals by impregnating them with quaternary ammonium cations (such as tetramethylammonium, tetraethylammonium, hexadecyltrimethylammonium, dibenzyldimethylammonium, benzyltriethylammonium, and cetyltrimethylammonium), to enhance the zeolite's capacity to absorb heavy metal, benzene, toluene, and xylene contaminants from water. See, for example, Cadena, et al., "Treatment of Waters Contaminated with BTX and Heavy Metals Using Tailored Zeolites," New Mexico Waste-management Education and Research Consortium Technical Completion Report for Project No. WERC-91-41 (February 1992). If not impregnated with a quaternary ammonium cation (QAC), zeolite does not function adequately as a molecular sieve for organic chemicals such as benzene, toluene, and xylene.

It has also been proposed to impregnate an aqueous solution of permanganate (such as permanganate of potassium, sodium, magnesium, calcium, barium, or lithium) into pores of substrates such as silica gel, alumina, silica-alumina, activated bauxite, and activated clay. The resulting impregnated porous substrates have been employed for filtering and deodorizing air. See, for example, U.S. Pat. No. 3,049,399, issued Aug. 14, 1962, to Gamson, et al.

However, above-mentioned U.S. Pat. No. 5,278,112 represents the first teaching of how to impregnate zeolite crystals (throughout their volume) with permanganate.

Further, because permanganates are strong oxidizing agents, those skilled in the art have avoided exposing quaternary ammonium cations or salts to permanganates (to avoid violent reactions of the type predicted in the literature). For this reason, until U.S. Pat. No. 5,278,112, it had not been proposed to treat a permanganate-impregnated substrate (such as permanganate-impregnated zeolite) with a quaternary ammonium cation or salt, nor to treat a substrate impregnated with a QAC (quaternary ammonium cation) to permanganate.

One of the inventors has found that zeolite crystals can readily be impregnated with a usefully high concentration of potassium permanganate. However, this inventor has recognized that, under certain conditions, such permanganate-impregnated zeolite reacts too rapidly to be practically useful for some air filtration applications. For example, when air contaminated with 50 ppm of hydrogen sulfide is caused to flow (at a rate of 15 liters per minute) through a bed of the inventive permanganate-impregnated zeolite crystals (where the crystals have size about 0.25 inch×0.125 inch, and the bed has volume of 75 cubic centimeters, and dimensions 1" (ld)×6"), the crystals typically become saturated with hydrogen sulfide within about 48 hours. Although the impregnated zeolite crystals usefully absorb hydrogen sulfide from air, the hydrogen sulfide absorption rate is significantly higher than can be achieved using conventional permanganate-impregnated alumina products, and is undesirably high for some applications.

For both air (and other gas) and water filtration applications, it would be desirable to reduce the rate at which permanganate-impregnated zeolite absorbs selected contaminants, and to control such absorption rate. Similarly, it would be desirable to reduce the rate at which QAC-impregnated zeolite absorbs selected contaminants, and to control such absorption rate. However, until the present invention, it was not known how to achieve either of these objectives.

Zeolite coated (but not impregnated) with manganese dioxide has been employed in water filtration systems to selectively absorb contaminants from a flowing stream of water, as described in U.S. Pat. No. 4,581,219, issued Apr. 8, 1986 to Imada, et al. However, until the present invention, it was not known how to impregnate zeolite with manganese dioxide, or to employ zeolite impregnated with manganese dioxide in water or gas filtration systems to selectively absorb contaminants from a flowing stream of water or gas.

SUMMARY OF THE INVENTION

In one class of embodiments, the invention is a process for producing zeolite crystals impregnated with one or more of sodium chlorite, acetic acid, citric acid, chlorine, sodium sulfite, and sodium bisulfite. The product of each such process is another class of embodiments of the invention.

Throughout the specification, including in the claims, the term "permanganate" used alone is intended to refer to any permanganate, including permanganate of potassium, sodium, magnesium, calcium, barium, or lithium.

A further aspect of the present invention relates to production of chlorine dioxide by moving fluid (such as air) relative to a first bed of zeolite crystals impregnated with sodium chlorite and/or zeolite crystals impregnated with chlorine, and by moving the fluid relative to a second bed of zeolite crystals impregnated with one of the following: phosphoric acid, acetic acid and citric acid. The first and second beds can be physically mixed together, or the fluid can flow sequentially through distinct first and second beds.

A further aspect of the present invention relates to removing chlorine dioxide from a fluid by moving the fluid relative to a bed of zeolite crystals impregnated with one of the following: potassium hydroxide, sodium sulfite, sodium bisulfate and ferrous sulfate. This method may be used to remove chlorine dioxide produced using the method for producing chlorine dioxide described above.

DETAILED DESCRIPTION OF THE PREFERRED EMBODIMENTS

Figure 1:
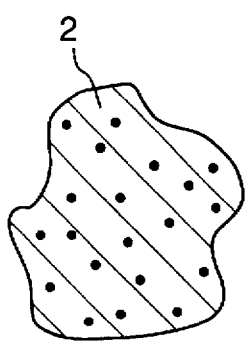
FIG. 1 is a cross-sectional view of a zeolite crystal impregnated with permanganate.

In one class of embodiments, the invention is a process for impregnating zeolite crystals (for example, crystals having size 0.125 inch×0.10 inch, 0.25 inch×0.125 inch, 0.125 inch×0.50 inch, or 0.50 inch×0.75 inch) with manganese dioxide, and the product of such process. Preferred embodiments of such process employ, as input material, zeolite crystals uniformly impregnated with potassium permanganate, with a 4% potassium permanganate content and a 15% moisture content. Such input material is preferably produced by a method including the steps of initially dehydrating the zeolite crystals to have about 5% moisture content, then mixing the dehydrated zeolite crystals with potassium permanganate crystals (preferably with a weight ratio P/T substantially equal to 4%, where P is the potassium permanganate weight and T is the total weight of the final product of the process), then immersing the crystal mixture in (or spraying the mixture with) water at about 190° F., thoroughly mixing the resulting slurry, and then air drying the mixed slurry to produce potassium permanganate-impregnated zeolite crystals having about 15% moisture content. Typically, the process employs four pounds of potassium permanganate and fifteen pounds of water for every 86 pounds of dehydrated (5% moisture) zeolite crystals, and this mixture (105 pounds) is dried to produce 100 pounds of permanganate-impregnated zeolite crystals having about 15% moisture content. FIG. 1 represents one such impregnated crystal, having channels uniformly impregnated with potassium permanganate 2.

Variations on the method described above produce zeolite crystals uniformly impregnated with potassium permanganate, having a potassium permanganate content of X%, where X is greater than 4, and is preferably in the range from 8 to 10. In such variations, the dehydrated zeolite crystals are mixed with solid potassium permanganate with a weight ratio P/T substantially equal to X%, where P is the potassium permanganate weight and T is the total weight of the final product of the process.

In variations on any of the above-described methods, permanganate other than potassium permanganate (such as permanganate of sodium, magnesium, calcium, barium, or lithium) is employed to impregnate the zeolite crystals.

In another variation on the described methods, zeolite crystals are immersed in (or sprayed with) aqueous potassium permanganate (having permanganate concentration in the range from about 10% to about 20%), where the weight of aqueous potassium permanganate is about 10% of the weight of the final product of the process. The crystals (after they are dried) will be uniformly impregnated with about a 1% concentration of potassium permanganate.

In yet another variation on the described methods, zeolite crystals are immersed in (or sprayed with) supersaturated aqueous potassium permanganate (having permanganate concentration of 20% or higher) at 190° F., where the weight of aqueous potassium permanganate is about 10% of the weight of the final product of the process. The zeolite crystals (after they are dried) are uniformly impregnated with a concentration of potassium permanganate greater than 1%.

For many applications (including air and water filtration applications), the desired concentration of potassium permanganate impregnated in zeolite crystals is in the range from about 1% to about 4% (or from about 1% to about 8% or 10%).

However, as explained above, permanganate-impregnated zeolite may have an activity rate too high or too low for some useful applications (i.e., its rate of absorption of contaminants may be too high, or too low, for some air or water filtration applications). One of the inventors has found that the rate at which permanganate-impregnated zeolite absorbs (or reacts with, or both absorbs and reacts with) selected contaminants can be controlled (and reduced or increased to a desired level) by applying a quaternary ammonium cation (QAC) coating to the permanganate-impregnated zeolite. This inventor has also found that the rate at which QAC-impregnated zeolite absorbs selected contaminants can be controlled (and reduced or increased to a desired level) by applying a permanganate coating to the QAC-impregnated zeolite.

Figure 2:
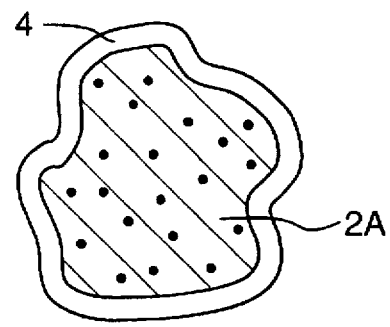
FIG. 2 is a cross-sectional view of the impregnated zeolite crystal of FIG. 1, after it has been coated with a QAC in accordance with the invention.

Thus, in a first class of preferred embodiments, the inventive method uses zeolite which has first been impregnated with permanganate (preferably, potassium permanganate) and then coated with a QAC (preferably, cetyltrimethylammonium, although other QACs are suitable for certain applications). FIG. 2 represents one such impregnated crystal, whose channels contain QAC 4 in the region near the crystal's surface, and whose channels are impregnated with potassium permanganate 2A throughout the volume of the crystal inside the region containing QAC 4.

In a second class of preferred embodiments, the invention uses zeolite which has been impregnated with a QAC (preferably, cetyltrimethylammonium) and then coated with permanganate (preferably, potassium permanganate). Either type of coated, impregnated zeolite (or a mixture of both types of coated, impregnated zeolite, or a mixture of uncoated impregnated zeolite with coated, impregnated zeolite of either type) is useful for a variety of molecular sieving applications (such as filtration of contaminants from air or water).

Development of the first class of preferred embodiments began with our unexpected observation that no obvious reaction resulted from immersion of potassium permanganate-impregnated zeolite in (or spraying of such impregnated zeolite with) liquid cetyltrimethylammonium chloride (with a weight ratio Q/T in the range from 0.1% to 5%, where Q is the cetyltrimethylammonium chloride weight and T is the total weight of the final product of the process). As a result of such immersion (or spraying), a QAC coating was applied to each permanganate-impregnated zeolite crystal in the sense that the QAC (cetyltrimethylammonium) entered the channels near each crystal's outer surface but the QAC did not penetrate farther into the interior of each crystal. From a practical point of view, one of the inventors has found that the weight ratio of liquid cetyltrimethylammonium chloride employed for coating permanganate-impregnated zeolite crystals should preferably (at least for most air filtration applications) satisfy the following relation: 0.1% <Q/T<0.5%, where Q is the cetyltrimethylammonium chloride weight and T is the total weight of the final product of the process.

As a result of permanganate leaching studies on the inventive QAC-coated, potassium permanganate-impregnated zeolite crystals (in which the coated, permanganate-impregnated zeolite crystals were immersed in, or sprayed with, water and the permanganate concentration in the water measured over time), one of the inventors determined that the QAC coating substantially slowed the permanganate leaching rate (and thus would substantially slow the expected activity rate, i.e., the rate at which the impregnated zeolite would absorb and/or react with contaminants such as organic chemicals). This result was highly unexpected in view of the conventional belief that the presence of QAC would increase zeolite's absorption of organic chemicals (such as toluene).

One of the inventors found that the activity rate of QAC-coated, potassium permanganate-impregnated zeolite depends on the concentration of the QAC solution with which the permanganate-impregnated zeolite is coated. Increasing the QAC concentration will decrease the activity rate. This inventor found that the leaching rate of permanganate from within QAC-coated, impregnated zeolite (and hence the expected activity rate) is negligible if the weight ratio of the QAC coating is in the range from 1% to 2% (i.e., if the weight of liquid cetyltrimethylammonium chloride employed for coating permanganate-impregnated zeolite crystals satisfies the relation 1%<Q/T<2%, where Q is the cetyltrimethylammonium chloride weight and T is the total weight of the final product of the process). To produce QAC-coated, potassium permanganate-impregnated zeolite for most air filtration applications, the optimum QAC coating weight ratio is in the range from 0.1% to 0.5% (i.e., the weight of liquid cetyltrimethylammonium chloride employed for coating the permanganate-impregnated zeolite crystals satisfies the relation 0.1%<Q/T<0.5%, where Q is the cetyltrimethylammonium chloride weight and T is the total weight of the final product of the process). However, for permanganate-impregnated zeolite crystals with a permanganate concentration greater than 4%, it may be desirable to employ a greater amount of QAC for the coating (i.e., the weight of liquid cetyltrimethylammonium chloride employed for the coating should satisfy the relation 1%<Q/T<2%, where Q is the cetyltrimethylammonium chloride weight and T is the total weight of the final product of the process).

An optimal permanganate-impregnated zeolite product for absorbing (and/or reacting with) any of a wide variety of contaminants (or contaminant groups) from a fluid (such as air or water) can be determined experimentally in the following manner. Uncoated, QAC-impregnated zeolite crystals (preferably produced in the manner described below) are mixed in various ratios with QAC-coated, permanganate-impregnated zeolite crystals, and the contaminant absorption and/or reaction characteristics of each mixture studied. The mixture producing the best absorption and/or reaction characteristics is identified as the optimal mixture.

Since the QAC known as cetyltrimethylammonium is commercially available in aqueous form, impregnation of zeolite with this aqueous QAC product can be accomplished more easily than can impregnation of zeolite with potassium permanganate. A preferred method for impregnating zeolite crystals with QAC to produce zeolite crystals uniformly impregnated with cetyltrimethylammonium cations includes the following steps: dehydrating the zeolite crystals to have about 5% moisture content, then immersing the dehydrated zeolite crystals in (or spraying the dehydrated crystals with) liquid cetyltrimethylammonium chloride (the cetyltrimethylammonium chloride weight is preferably in the range from 5% to 15% of the total weight of the final product of the process) and thoroughly mixing the resulting slurry, and finally air drying the mixed slurry to produce the cetyltrimethylammonium-impregnated zeolite crystals. Typically, fifteen pounds of liquid QAC and 90 pounds of dehydrated (5% moisture) zeolite crystals are employed to produce each 100 pounds of such cetyltrimethylammonium-impregnated zeolite crystals.

Although the QAC in preferred embodiments of the invention is cetyltrimethylammonium, other QACs can be substituted for cetyltrimethylammonium in alternative embodiments.

One of the inventors has also unexpectedly observed that no obvious reaction resulted from immersion of cetyltrimethylammonium-impregnated zeolite in (or spraying of such impregnated zeolite with) aqueous potassium permanganate (where the weight of the potassium permanganate is in the range from 0.1% to 2% of the weight of the impregnated zeolite). Where the weight of the potassium permanganate in the immersing (or spraying) solution is in the range from 0.1% to 1% of the weight of the impregnated zeolite, the immersion (or spraying) results in application of a permanganate coating to each QAC-impregnated zeolite crystal (in the sense that permanganate enters the channels near each crystal's outer surface but permanganate does not penetrate farther into the interior of each crystal).

Where the weight of the permanganate in the immersing (or spraying) solution is above 1% of the weight of the impregnated zeolite, this inventor has found that immersion of QAC-impregnated zeolite crystals in (or spraying of QAC-impregnated zeolite with) aqueous permanganate results in penetration of permanganate throughout the channels of each crystal (with permanganate displacing QAC from channels not only near each crystal's outer surface but also from channels deep within the interior of each crystal). From a practical point of view, potassium permanganate solution for coating QAC-impregnated zeolite crystals, preferably (at least for many air filtration applications) includes a total weight of permanganate in the range from 0.1% to 0.5% of the weight of the final weight of the permanganate-coated, QAC-impregnated product of the process.

As a result of permanganate leaching studies on potassium permanganate-coated, QAC-impregnated zeolite crystals (in which the coated, QAC-impregnated zeolite crystals were immersed in water and the QAC concentration in the water measured over time), it has been determined that the permanganate coating substantially slowed the QAC leaching rate (and thus would substantially slow the expected activity rate, i.e., the rate at which the impregnated zeolite would absorb contaminants such as organic chemicals).

The activity rate of permanganate-coated, QAC-impregnated zeolite depends on the concentration of the permanganate solution with which the QAC-impregnated zeolite is coated. Increasing the permanganate concentration of the coating solution will decrease the activity rate (until the concentration is reached at which the permanganate penetrates through the entire volume of each zeolite crystal, displacing QAC impregnated throughout such volume). To produce potassium permanganate-coated, QAC-impregnated zeolite for most air filtration applications, the optimum weight of permanganate in the coating solution is in the range from 0.1% to 0.5% of the final weight of the permanganate-coated, QAC-impregnated product of the process.

An optimal QAC-impregnated zeolite product for absorbing any of a wide variety of contaminants (or contaminant groups) from a fluid (such as air or water) can be determined experimentally in the following manner. Uncoated, permanganate-impregnated zeolite crystals are mixed in various ratios with permanganate-coated, QAC-impregnated zeolite crystals, and the contaminant absorption characteristics of each mixture studied. The mixture producing the best absorption characteristics is identified as the optimal mixture.

It may also be useful to mix permanganate-coated, QAC-impregnated zeolite crystals with QAC-coated, permanganate-impregnated zeolite crystals.

The characteristics of a QAC (or permanganate) coating on a zeolite crystal impregnated with permanganate (or QAC) can be varied to control the reaction rate of the substance impregnated within the zeolite. Such characteristics can be varied by changing the concentration of the coating solution in which (or with which) the impregnated zeolite crystal is immersed (or sprayed) to form the coating.

Important aspects of the invention are methods for producing zeolite crystals impregnated with manganese dioxide, the product of such methods, and methods for using such manganese dioxide-impregnated zeolite crystals to absorb contaminants from fluid (especially liquids).

One preferred technique for producing the inventive manganese dioxide-impregnated crystals is to flow a gas comprising one or more of hydrogen, nitrogen, ethylene, and formaldehyde through a bed of permanganate-impregnated zeolite crystals (preferably, with the crystals enclosed in a vessel or other container having a gas inlet and a gas outlet). Alternatively, the permanganate-impregnated zeolite crystals are caused to flow through a non-flowing volume of such gas. Also alternatively, the gas which flows through the permanganate-impregnated zeolite crystals comprises one or more of hydrogen, nitrogen, ethylene, formaldehyde, and other gases similar to these gases (but not $H_2S$ gas).

In another preferred embodiment, the invention produces manganese dioxide-impregnated zeolite crystals from zeolite crystals impregnated with permanganate (with or without a QAC coating) in the following manner. The permanganate-impregnated zeolite crystals (e.g., crystals having a potassium permanganate content of about 4% and a moisture content of about 15%) are employed to filter fluid (such as air or liquid water) containing a gas (e.g., a contaminant gas) comprising one or more of hydrogen, nitrogen, ethylene, and formaldehyde. The filtration can be performed either by flowing the fluid through the crystals or by flowing the crystals through the fluid. During the filtration step, the crystals eventually become "spent" due to chemical reaction with the fluid (including one or more of the listed gases in the fluid). One of the inventors has recognized that each of the "spent" zeolite crystals is substantially uniformly impregnated with manganese dioxide throughout its volume.

One mechanism by which permanganate-impregnated zeolite becomes impregnated with manganese dioxide (as it becomes "spent" when employed to filter air) is believed to be as follows. This example assumes that the zeolite is initially impregnated with potassium permanganate ($KMnO_4$), and that the potassium permanganate-zeolite is employed to filter air contaminated with ethylene ($C_2H_4$). The following reaction is believed to explain the result that manganese dioxide forms in the pores throughout the volume of each zeolite crystal as it becomes "spent" (activated to $MnO_2$):

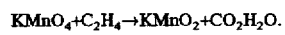

$KMnO_4+C_2H_4 \rightarrow KMnO_2+CO_2H_2O$.

In a variation on the previous example, the air is contaminated with another oxidizable gas similar to ethylene, such as formaldehyde (HCHO). In the latter case, the following reaction is believed to explain the result that manganese dioxide forms in the pores throughout the volume of each zeolite crystal as it becomes "spent" (activated to $MnO_2$):

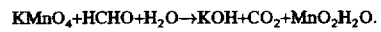

$KMnO_4+HCHO+H_2O \rightarrow KOH+CO_2+MnO_2H_2O$.

Figure 3:
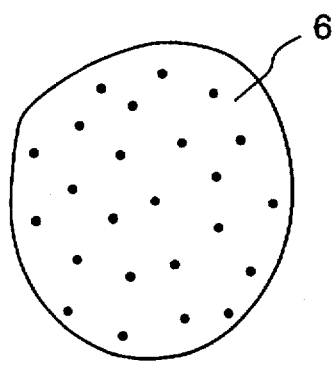
FIG. 3 is a cross-sectional view of a zeolite crystal impregnated with manganese dioxide.

FIG. 3 represents a "spent" zeolite crystal produced according to the invention, having channels substantially uniformly impregnated with manganese dioxide 6 throughout the crystal's volume.

Figure 4:
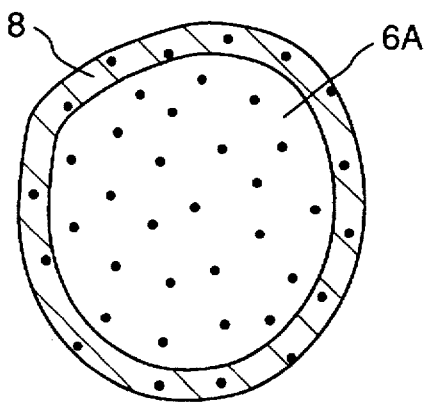
FIG. 4 is a cross-sectional view of the impregnated zeolite crystal of FIG. 3, after it has been coated with a QAC in accordance with the invention.

The manganese dioxide-impregnated zeolite crystals of the invention can be coated with a QAC (or with a permanganate), e.g., as a result of any of the above-described coating operations. FIG. 4 represents one such coated, impregnated crystal, whose channels contain QAC 8 in the region near the crystal's surface, and whose channels are impregnated with manganese dioxide 6A throughout the volume of the crystal inside the region containing QAC 8. The presence of such a QAC coating allows regulated time release control of the impregnating manganese dioxide 6A (which is an oxidizing filtering agent), and thus permits a controlled diffusion (or absorption) rate in applications in which QAC-coated, manganese dioxide-impregnated zeolite crystals are employed to absorb contaminants from a fluid (especially a liquid such as water). The characteristics of the QAC coating can be varied to control the reaction rate of the impregnating substance (manganese dioxide) within the zeolite crystals. Such characteristics can be varied by changing the concentration of the coating solution employed to coat the impregnated zeolite crystals.

The manganese dioxide-impregnated zeolite crystals, or QAC-coated, manganese dioxide-impregnated zeolite crystals of the invention, can be used for a variety of molecular sieving applications, such as filtration of contaminants from fluid (especially liquid). Various combinations of such coated and uncoated crystals can be employed to match specific environmental circumstances which can be calculated by analysis of the fluid to be treated.

To perform fluid filtration, the fluid is caused to flow through a bed of the inventive manganese dioxide-impregnated zeolite crystals (coated or uncoated), or the crystals are caused to flow through the fluid.

Other embodiments of the invention are a process for producing zeolite crystals impregnated with phosphoric acid, phosphoric acid-impregnated zeolite crystals produced by such process, and methods for using phosphoric acid-impregnated crystals to absorb contaminants from fluid.

Zeolite crystals have some capacity to absorb $NH_3$ due to their cation exchange capacity. By impregnating zeolite crystals uniformly throughout their volume with phosphoric acid (to cause the impregnated zeolite crystals to include from 1% to 10% phosphoric acid by weight), the $NH_3$ absorption capacity is increased greatly (up to five times the $NH_3$ absorption capacity of non-impregnated zeolite crystals).

Figure 5:
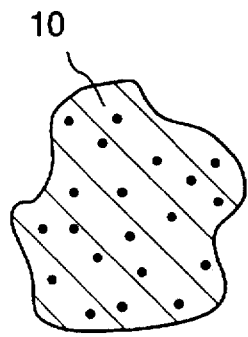
FIG. 5 is a cross-sectional view of a zeolite crystal impregnated with phosphoric acid.

Preferably, the impregnation step is performed by immersing the zeolite in (or spraying the zeolite with) aqueous phosphoric acid. The inventive method preferably includes the steps of: dehydrating the zeolite crystals until they have moisture content substantially below their initial moisture content (preferably until their moisture content is about 5%), then immersing the dehydrated zeolite crystals in (or spraying the dehydrated crystals with) an aqueous solution of phosphoric acid at high temperature and thoroughly mixing the resulting slurry, and finally air drying the mixed slurry to produce impregnated zeolite crystals. FIG. 5 represents one such impregnated crystal, having channels uniformly impregnated with phosphoric acid 10.

Phosphoric acid-impregnated zeolite crystals can be used to control $NH_3$ odor in fluids such as air (or liquid manure). The reaction for neutralizing $NH_3$ gas in such fluids is believed to be $$2NH_3 + H_3PO_4 \rightarrow (NH_4)_2HPO_4,$$

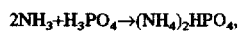

where $(NH_4)_2HPO_4$ has no odor.

We contemplate that beds of phosphoric acid-impregnated zeolite crystals can be used in animal confinement facilities to receive liquid animal wastes. Similarly, phosphoric acid-impregnated zeolite crystals can be used for such applications as in cat litter boxes and in stable "freshener" products for filtering air (or liquids).

Other embodiments of the invention are a process for producing zeolite crystals impregnated with one of the following: (1) sodium chlorite, (2) acetic acid, (3) citric acid, and (4) chlorine solution. Other embodiments of the invention are directed to zeolite crystals impregnated with one of the following: (1) sodium chlorite, (2) acetic acid, (3) citric acid, and (4) chlorine solution. Other embodiments of the invention are directed to using zeolite crystals impregnated with one of the chemicals listed directly above (i.e., (1) sodium chlorite, (2) acetic acid, (3) citric acid, and (4) chlorine solution) to absorb contaminants from fluid.

Figure 6:
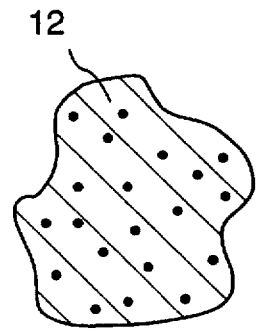
FIG. 6 is a cross-sectional view of a zeolite crystal impregnated with one of the following impregnating agents: sodium chlorite, acetic acid, citric acid, and chlorine.

The impregnation step is performed by immersing the zeolite in (or spraying the zeolite with) an aqueous solution of one or more of the following: (1) sodium chlorite, (2) acetic acid, (3) citric acid, and (4) chlorine. The inventive method preferably includes the steps of: dehydrating the zeolite crystals until they have moisture content substantially below their initial moisture content (preferably until their moisture content is about 5%), then immersing the dehydrated zeolite crystals in (or spraying the dehydrated crystals with) one or more of the aqueous solutions listed above (i.e., (1) sodium chlorite, (2) acetic acid, (3) citric acid, and (4) chlorine) at high temperature and thoroughly mixing the resulting slurry, and finally air drying the mixed slurry to produce impregnated zeolite crystals. FIG. 6 represents one such impregnated crystal, having channels uniformly impregnated with a chemical 12 chosen from the following group: (1) sodium chlorite, (2) acetic acid, (3) citric acid, and (4) chlorine solution. Chemical 12 is alternatively a mixture of two or more of these substances.

Other embodiments of the invention are a process for producing zeolite crystals impregnated with one of the following: (1) sodium sulfite, (2) sodium bisulfite (also called sodium metabisulfite), and (3) ferrous sulfate. Other embodiments of the invention are directed to zeolite crystals impregnated with one of the following: (1) sodium sulfite, (2) sodium bisulfite, and (3) ferrous sulfate. Other embodiments of the invention are directed to using zeolite crystals impregnated with one of the chemicals listed directly above (i.e., (1) sodium sulfite, (2) sodium bisulfite, and (3) ferrous sulfate) to absorb contaminants from fluid.

Figure 7:
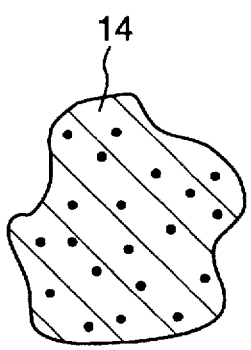
FIG. 7 is a cross-sectional view of a zeolite crystal impregnated with one of the following impregnating agents: sodium sulfite, sodium bisulfite, and ferrous sulfate.

The impregnation step is performed by immersing the zeolite in (or spraying the zeolite with) an aqueous solution of one or more of the following: (1) sodium sulfite, (2) sodium bisulfite, and (3) ferrous sulfate. The inventive method preferably includes the steps of: dehydrating the zeolite crystals until they have moisture content substantially below their initial moisture content (preferably until their moisture content is about 5%), then immersing the dehydrated zeolite crystals in (or spraying the dehydrated crystals with) one or more of the aqueous solutions listed above (i.e., (1) sodium sulfite, (2) sodium bisulfite, and (3) ferrous sulfate) at high temperature and thoroughly mixing the resulting slurry, and finally air drying the mixed slurry to produce impregnated zeolite crystals. FIG. 7 represents one such impregnated crystal, having channels uniformly impregnated with a chemical 14 chosen from the following group: (1) sodium sulfite, (2) sodium bisulfite, and (3) ferrous sulfate. Chemical 14 is alternatively a mixture of two or more of these substances.

Some of the impregnated zeolite crystals described above can be used in a process to produce Chlorine dioxide ($ClO_2$). Chlorine dioxide is useful for killing biological contaminants such as microorganisms, mold, fungi, yeast and bacteria.

First, a fluid containing oxygen (typically, but not necessarily air) is caused to move relative to a first bed of: (1) zeolite crystals which are impregnated with sodium chlorite ($NaClO_2$) or (2) a mixture of zeolite crystals impregnated with sodium chlorite and zeolite crystals impregnated with chlorine. The inclusion of zeolite crystals impregnated with chlorine is thought to enhance chlorine dioxide production. Then, the fluid is caused to move relative to a second bed of zeolite crystals impregnated with: (1) phosphoric acid ($H_3PO_4$), (2) acetic acid ($CH_3COOH$), or (3) citric acid. Upon moving the fluid (containing oxygen) relative to the second bed, chlorine dioxide is released by one or more of the following equations.

For a phosphoric acid impregnated second bed:

$$O_2 + H_3PO_4 + NaClO_2 \rightarrow ClO_2\uparrow + NaHPO_4 + H_2O$$

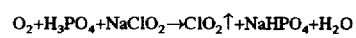

For an acetic acid impregnated second bed:

$$O_2 + CH_3COOH + NaClO_2 \rightarrow ClO_2\uparrow + CH_3COONa \text{ (sodium acetate)} + H_2O$$

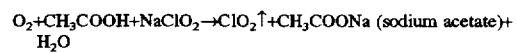

For a citric acid impregnated second bed:

$$O_2 + \text{citric acid} + 3NaClO_2 \longrightarrow ClO_2\uparrow + HOC\begin{array}{c}CH_2COONa\\|\\-COONa\\|\\CH_2COONa\end{array} + H_2O$$

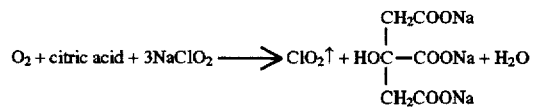

While the foregoing process for producing $ClO_2$ has been described with reference two distinct (first and second) beds of impregnated zeolite crystals, a single bed containing a mixture of crystals can be used as long as the mixed bed contains both impregnated zeolite crystals from the first bed described above and zeolite crystals from the second bed described above. As an illustrative example, a mixture bed of zeolite crystals impregnated with sodium chlorite, mixed with zeolite crystals impregnated with phosphoric acid can be used to produce chlorine dioxide (by flowing a fluid containing oxygen through it).

While chlorine dioxide can kill microorganisms as described above, chlorine dioxide itself is a contaminant. Therefore, it is sometimes desirable to remove chlorine dioxide from the fluid stream after the chlorine dioxide has performed biological purification of the fluid stream. Another aspect of the present invention relates to a multi-step filtration process in which chlorine dioxide is first produced in a fluid stream and, subsequently, removed from the fluid stream.

First, a fluid is cased to be moved relative to primary bed(s) of zeolite crystals which will cause chlorine dioxide to be released, as described above. These primary bed(s) of zeolite crystals may include a first and second bed, or a mixture bed, as described above. Upon moving relative to the primary bed(s), chlorine dioxide is released (generally as a gas) and biological contaminants are killed in the fluid.

Then, the fluid is moved relative to a secondary bed (filter) of zeolite crystals impregnated with one of the following: (1) potassium hydroxide (KOH), (2) sodium sulfite, (3) sodium bisulfite, and (4) ferrous sulfate. The zeolite crystals of the secondary bed react with the chlorine dioxide to remove the chlorine dioxide from the fluid. Some chemical equations describing possible reactions in the secondary bed follow.

For a secondary bed of potassium hydroxide:

$$2KOH + 2ClO_2 \rightarrow KClO_2 + KClO_4 + H_2O$$

For a secondary bed of sodium sulfite:

$$ClO_2 + Na_2SO_3 \rightarrow H_2O + S_2O_5 + H^+{}_3ClO_3$$

Note that $H^{++}$ from the acids involved in the previous reactions cancel this reaction.

For a secondary bed of sodium bisulfite:

$$ClO_2 + Na_2SO_5 \rightarrow H_2O + S_2O_5 + H^+{}_3ClO_3$$

Note that $H^{++}$ from the acids involved in the previous reactions cancel this reaction.

The preferred composition of the secondary bed is ferrous sulfate. For a secondary bed of ferrous sulfate:

$$ClO_2 + Fe^{++}SO_4 \longrightarrow Fe^{+++} + Cl^- + ClO_2 \longrightarrow$$

$FeCl_3$ (primarily).

When using a secondary bed of ferrous sulfate a color change, from white to brown, takes place. This is an indicator of neutralization.

Various modifications and variations of the described method of the invention will be apparent to those skilled in the art without departing from the scope and spirit of the invention. Although the invention has been described in connection with specific preferred embodiments, it should be understood that the invention as claimed should not be unduly limited to such specific embodiments.

What is claimed is:

1. A zeolite crystal having channels uniformly impregnated with an impregnating agent, wherein the impregnating agent is sodium sulfite.

2. A zeolite crystal having channels uniformly impregnated with an impregnating agent, wherein the impregnating agent is sodium bisulfite.

* * * * *